(12) United States Patent  (10) Patent No.: US 8,384,247 B2
Yerazunis et al.  (45) Date of Patent: Feb. 26, 2013

(54) WIRELESS ENERGY TRANSFER TO MOVING DEVICES

(75) Inventors: William S. Yerazunis, Acton, MA (US); Vishwanath Iyer, Natick, MA (US); Da Huang, Durham, NC (US); Chunjie Duan, Medfield, MA (US); Koon Hoo Teo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 410 days.

(21) Appl. No.: 12/686,497

(22) Filed: Jan. 13, 2010

(65) Prior Publication Data

US 2011/0169336 A1 Jul. 14, 2011

(51) Int. Cl.
H01F 27/42 (2006.01)
H01F 37/00 (2006.01)
H01F 38/00 (2006.01)

(52) U.S. Cl. ........................ 307/104; 333/195
(58) Field of Classification Search .................. 307/104
See application file for complete search history.

(56) References Cited

U.S. PATENT DOCUMENTS

| | | | | |
|---|---|---|---|---|
| 7,741,734 B2* | 6/2010 | Joannopoulos et al. | ...... | 307/104 |
| 7,825,543 B2* | 11/2010 | Karalis et al. | ................. | 307/104 |
| 8,035,255 B2* | 10/2011 | Kurs et al. | ..................... | 307/104 |
| 8,076,800 B2* | 12/2011 | Joannopoulos et al. | ...... | 307/104 |
| 8,084,889 B2* | 12/2011 | Joannopoulos et al. | ...... | 307/104 |
| 8,097,983 B2* | 1/2012 | Karalis et al. | ................. | 307/104 |
| 8,143,746 B2* | 3/2012 | Marzetta et al. | ............. | 307/104 |
| 2007/0222542 A1 | 9/2007 | Joannopoulos | | |
| 2008/0278264 A1* | 11/2008 | Karalis et al. | ................. | 333/219 |
| 2009/0244544 A1* | 10/2009 | Terrel et al. | ..................... | 356/461 |
| 2011/0133564 A1* | 6/2011 | Teo et al. | ....................... | 307/104 |
| 2011/0133565 A1* | 6/2011 | Teo et al. | ....................... | 307/104 |
| 2011/0133566 A1* | 6/2011 | Teo et al. | ....................... | 307/104 |
| 2011/0133567 A1* | 6/2011 | Teo et al. | ....................... | 307/104 |
| 2011/0156486 A1* | 6/2011 | Teo et al. | ....................... | 307/104 |
| 2011/0156487 A1* | 6/2011 | Teo et al. | ....................... | 307/104 |

OTHER PUBLICATIONS

Amnon Yariv, Yong Xu, Reginald K. Lee, and Axel Scherer, Coupled-resonator optical waveguide: a proposa and analysis, 1999, Optics Letters, vol. 24, pp. 711-713.1.*

* cited by examiner

*Primary Examiner* — Rexford Barnie
*Assistant Examiner* — Toan Vu
(74) *Attorney, Agent, or Firm* — Dirk Brinkman; Gene Vinokur (57) ABSTRACT

A system exchanges energy wirelessly and includes a source configured to generate evanescent waves, in response to receiving the energy, on at least part of a surface of the source. The system also includes a sink configured to receive the energy wirelessly from the source via a coupling of the at least part of the evanescent waves and a load configured to receive the energy from the sink. The load and the sink are configured to move along the surface of the source such that the at least a part of the evanescent waves are coupled between the source and the sink within an energy transfer area.

21 Claims, 8 Drawing Sheets

WIRELESS ENERGY TRANSFER TO MOVING DEVICES

RELATED APPLICATIONS

This U.S. Non-Provisional Patent Application is related to application Ser. No. 12/630,498, entitled "Wireless Energy Transfer with Negative Index Material," filed Dec. 3, 2009, by Koon Hoo Teo et al., and application Ser. No. 12/686,466, entitled "System and Method for Energy Transfer," filed Jan. 13, 2010, by KoOn Hoo Teo et al. both incorporated herein by reference.

FIELD OF THE INVENTION

The present invention relates to transferring energy, and more particularly, to transferring energy wirelessly to moving devices.

BACKGROUND OF THE INVENTION

Wireless Energy Transfer

Inductive coupling is used in a number of wireless energy transfer applications such as charging a cordless electronic toothbrush or hybrid vehicle batteries. In coupled inductors, such as transformers, a source, e.g., primary coil, generates energy as an electromagnetic field, and a sink, e.g., a secondary coil, subtends that field such that the energy passing through the sink is optimized, e.g., is as similar as possible to the energy of the source. To optimize the energy, a distance between the source and the sink should be as small as possible, because over greater distances the induction method is highly ineffective.

Resonant Coupling System

In resonant coupling, two resonant electromagnetic objects, i.e., the source and the sink, interact with each other under resonance conditions. The resonant coupling transfers energy from the source to the sink over a mid-range distance, e.g., a fraction of the resonant frequency wavelength.

Figure 1:
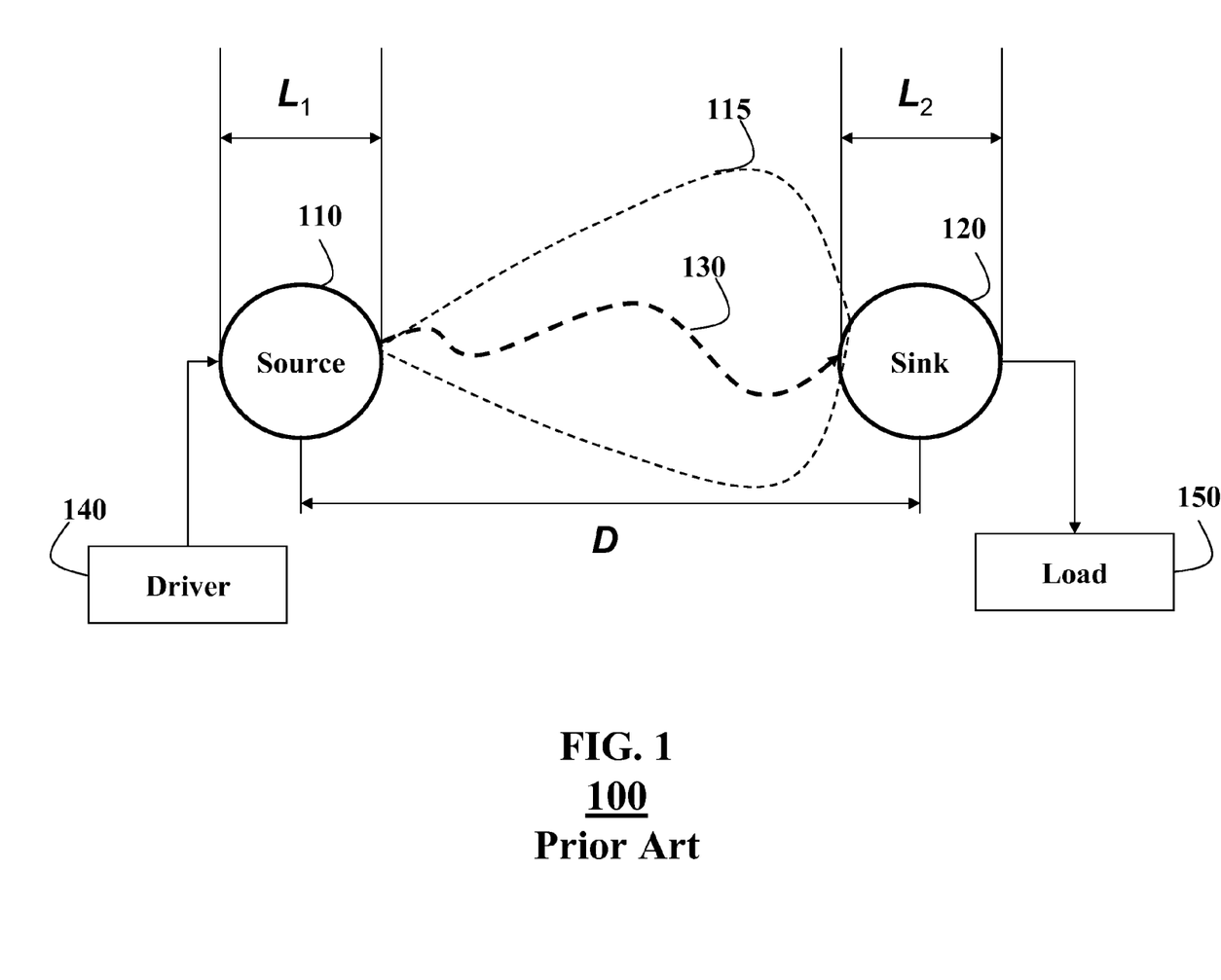
FIG. 1 is a block diagram of a conventional resonant coupling system.

FIG. 1 shows a conventional resonant coupling system 100 for transferring energy from a resonant source 110 to a resonant sink 120. The general principle of operation of the system 100 is similar to inductive coupling. A driver 140 inputs the energy into the resonant source to form an oscillating electromagnetic field 115. The excited electromagnetic field attenuates at a rate with respect to the excitation signal frequency at driver or self resonant frequency of source and sink for a resonant system. However, if the resonant sink absorbs more energy than is lost during each cycle, then most of the energy is transferred to the sink. Operating the resonant source and the resonant sink at the same resonant frequency ensures that the resonant sink has low impedance at that frequency, and that the energy is optimally absorbed. An example of the resonant coupling system is disclosed in U.S. Patent Applications 2008/0278264 and 2007/0222542, incorporated herein by reference.

The energy is transferred, over a distance D, between resonant objects, e.g., the resonant source having a size $L_1$ and the resonant sink having a size $L_2$. The driver connects a power provider to the source, and the resonant sink is connected to a power consuming device, e.g., a resistive load 150. Energy is supplied by the driver to the resonant source, transferred wirelessly and non-radiatively from the resonant source to the resonant sink, and consumed by the load. The wireless non-radiative energy transfer is performed using the field 115, e.g., the electromagnetic field or an acoustic field of the resonant system. For simplicity of this specification, the field 115 is an electromagnetic field. During the coupling of the resonant objects, evanescent waves 130 are propagated between the resonant source and the resonant sink.

Coupling Enhancement

According to coupled-mode theory, strength of the coupling is represented by a coupling coefficient k. The coupling enhancement is denoted by an increase of an absolute value of the coupling coefficient k. Based on the coupling mode theory, the resonant frequency of the resonant coupling system is partitioned into multiple frequencies. For example, in two objects resonance compiling systems, two resonant frequencies can be observed, named even and odd mode frequencies, due to the coupling effect. The coupling coefficient of two objects resonant system formed by two exactly same resonant structures is calculated by partitioning of the even and odd modes according to $$\kappa = \pi |f_{even} - f_{odd}|. \qquad (1)$$

It is a challenge to enhance the coupling. For example, to optimize the coupling, resonant objects with a high quality factor are selected. However, when the source and the sink are in relative motion to each other during the energy exchange, the coupling between the source and the sink can be broken. Accordingly, it is desired to optimize wireless energy transfer between the source and the sink having at least one degree of freedom.

SUMMARY OF THE INVENTION

Embodiments of the invention are based on a realization that a coupling of evanescent waves between an energy source and an energy sink having at least one degree of freedom can be optimized by implementing the source as a waveguide configured to generated evanescent waves at least on a part of a surface of the waveguide and arranging the sink such that the sink moves along the waveguide while maintaining the coupling to the waveguide within an energy transfer area.

Embodiments of the invention can be used in a variety of applications, systems and devices, which require wireless energy transfer to a sink having at least one degree of freedom, e.g., a train, and an elevator car.

One embodiment discloses a system configured to transfer energy wirelessly, comprising: a source configured to generate evanescent waves, in response to receiving the energy, on at least part of a surface of the source; a sink configured to receive the energy wirelessly from the source via a coupling of the at least part of the evanescent waves; and a load configured to receive the energy from the sink, wherein the load and the sink are configured to move along the surface of the source such that the at least a part of the evanescent waves are coupled between the source and the sink within an energy transfer area.

Another embodiment discloses a method for transferring energy wirelessly via a coupling of near-fields, comprising steps of providing a source configured to transfer an energy wirelessly to a sink via the coupling of near-fields of the source and the sink, wherein the source and the sink are non-radiative structures configured to generate EM near-fields in response to receiving the energy; and moving the sink along a surface of the source such that the near-field of the source and the near-field of the sink are coupled within an energy transfer area.

DETAILED DESCRIPTION OF THE PREFERRED EMBODIMENTS

Embodiments of the invention are based on a realization that a coupling of evanescent waves between an energy source and an energy sink having at least one degree of freedom can be optimized by implementing the source as a waveguide configured to generated evanescent waves at least on a part of a surface of the waveguide and arranging the sink such that the sink moves along the waveguide while maintaining the coupling to the waveguide within an energy transfer area.

Embodiments of the invention can be used in a variety of applications, systems and devices, which require wireless energy transfer to a sink having at least one degree of freedom, e.g., a train, and an elevator car.

Figure 2A:
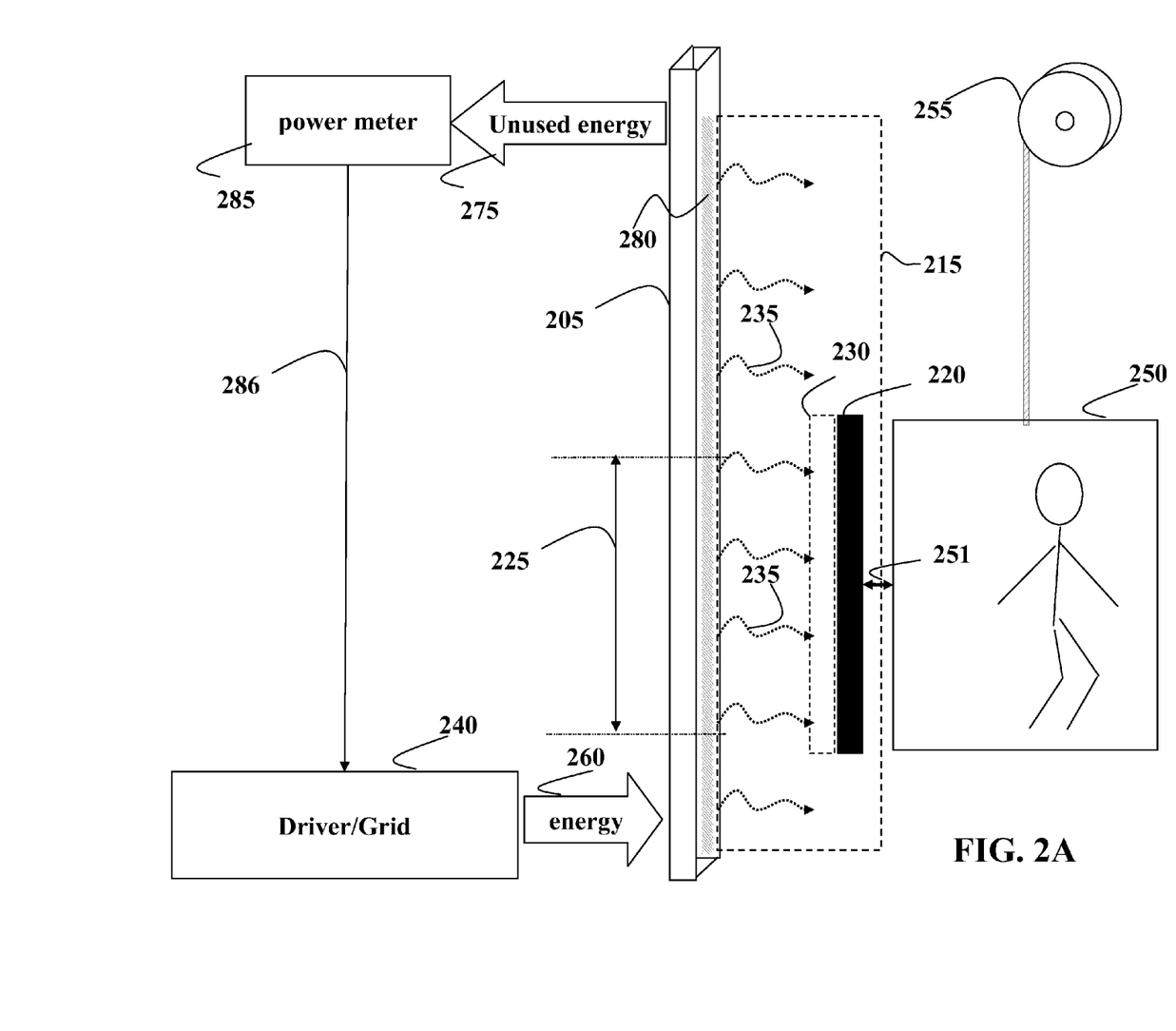
FIG. 2A is a schematic of an example of a system for transferring energy to a moving device according to embodiments of the invention.

FIG. 2A shows an embodiment of our invention configured to optimized wireless energy transfer from the source implemented as a waveguide 205 to the sink 220 configured to move along the waveguide. In one embodiment, the sink is connected to a cable-less elevator car, i.e., a load 250, and the waveguide is installed at an elevator shaft. When the driver 240 supplies the energy 260 to the waveguide, an EM near-field 215 is generated along at least part of the surface of the waveguide. Typically, the near-field 215 is generated according to a particular energy distribution pattern. The pattern, as described below, has different zones such as optimal zones, wherein near-field intensities are optimal, i.e., maximum. In blind zones, the near-field intensities are suboptimal.

At least some of the evanescent waves 235, which are confined to the near field 215, reaches the sink and are coupled to the sink within the energy transfer area 225. The sink is affixed 251 to the load such that the motion of the load caused by, e.g., a pulling mechanism 255, causes the motion of the sink. When the sink is moved along the waveguide, the energy transfer area is moved accordingly while preserving the coupling between the source and the sink. In one embodiment, a negative index material (NIM) 230 is arranged within the energy transfer area such that to increase the coupling.

The driver can be connected to a power grid and supply energy to the waveguide, e.g., inductively. In one embodiment, unused energy 275, i.e., the energy not transferred to the sink 220, is measured by a power meter 285 and supplied back 286 to the driver, using, e.g., rectification, or radio frequency circulator.

In another embodiment, power meter 285 absorbs the unused energy, and signal 286 is a feedback control signal indicating an amount of the unused energy. In one variation of this embodiment, the driver uses the amount of the unused energy to produce the energy 260 such that to minimize the unused energy.

The waveguide is configured to generate electromagnetic (EM) evanescent waves. For example, in one embodiment, the waveguide is implemented via a conductive wire. In another embodiment, one side of the waveguide includes has perforations or slots 280 to allow evanescent waves to exist on a surface of the waveguide. Examples of the waveguides are described below.

Figure 2B:
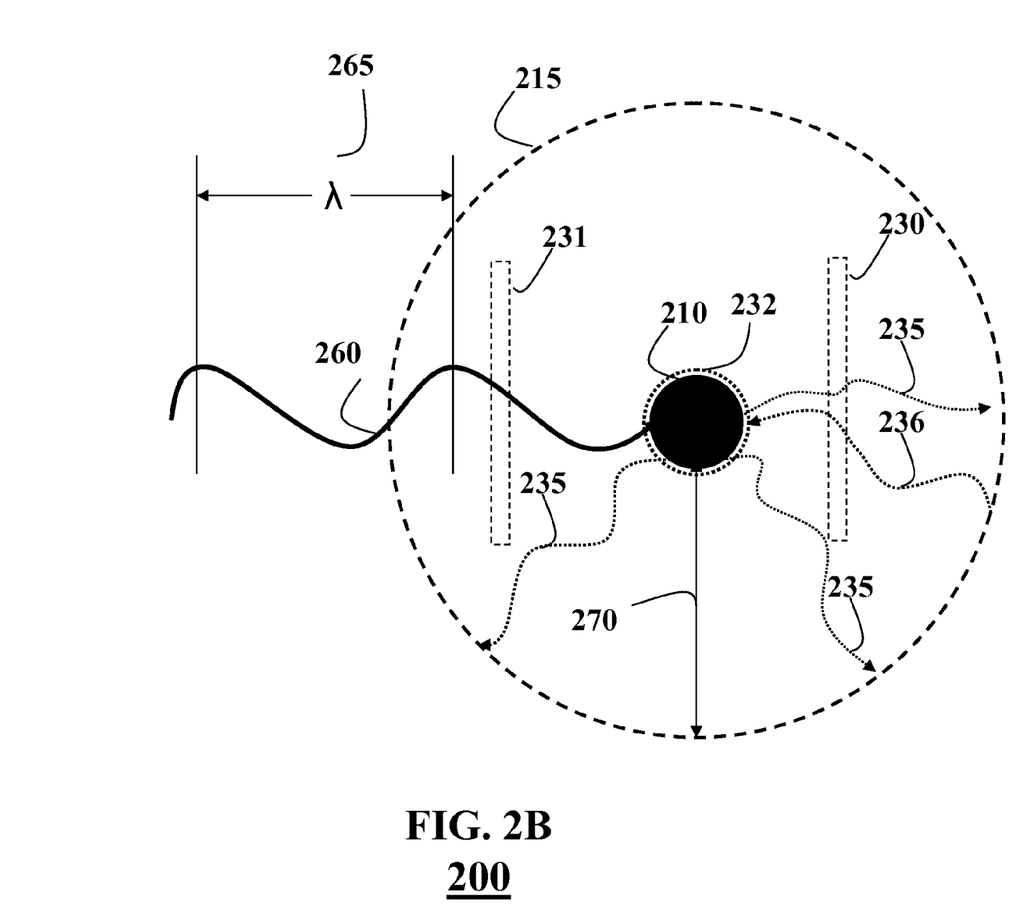
FIG. 2B is a diagram of a structure according an embodiment of the invention.

FIG. 2B shows an example of a system configured to exchange, e.g., to transmit or to receive, the energy wirelessly according some embodiments of the invention. The system includes the structure 210 configured to generate an electromagnetic near-field 215 when the energy is received by the structure and exchange the energy wirelessly via a coupling of evanescent waves.

In one embodiment, the energy 260 is supplied by the driver 240 as known in the art. In this embodiment, the structure 210 serves as a source of the wireless energy transfer system. In an alternative embodiment, the energy 260 is supplied wirelessly from the source (not shown). In that embodiment, the structure 210 serves as the sink of the wireless energy transfer system.

The system 200 optionally includes negative index material (NIM) 230-232 arranged within the near-field 215. In one embodiment, the NIM 232 substantially encloses the EM structure 210. The NIM is a material with negative permittivity and negative permeability properties. Several unusual phenomena are known for this material, e.g., evanescent wave amplification, surface plasmoni-like behavior and negative refraction. Embodiments of the invention appreciated and utilized the unusual ability of NIM to amplify evanescent waves, which optimizes wireless energy transfer.

The shape and dimensions of the near-field, i.e., the energy distribution pattern, depends on a frequency of the external energy 260, and on a resonant frequency of the EM structure 210, determined in part by a shape of the EM structure, e.g., circular, helical, cylindrical shape, and parameters of a material of the EM structure such as conductivity, relative permittivity, and relative permeability.

Usually, a range 270 of the near-field is in an order of a dominant wavelength of the system. In non resonant systems, the dominant wavelength is determined by a frequency of the external energy 260, i.e., the wavelength $\lambda$ 265. In resonant systems, the dominant wavelength is determined by a resonant frequency of the EM structure. In general, the dominant wavelength is determined by the frequency of the wirelessly exchanged energy.

The resonance is characterized by a quality factor (Q-factor), i.e., a dimensionless ratio of stored energy to dissipated energy. Because the objective of the system 200 is to transfer or to receive the energy wirelessly, the frequency of the driver or the resonant frequency is selected to increase the dimensions of the near-field region. In some embodiments, the frequency of the energy 260 and/or the resonant frequency is in diapason from MHz to GHz. In other embodiments, aforementioned frequencies are in the domain for visible light.

Evanescent Wave

An evanescent wave is a near-field standing wave with an intensity that exhibits exponential decay with distance from a boundary at which the wave is formed. The evanescent waves 235 are formed at the boundary between the structure 210 and other "media" with different properties in respect of wave motion, e.g., air. The evanescent waves are formed when the external energy is received by the EM structure and are most intense within one-third of a wavelength of the near field from the surface of the EM structure 210.

Whispering Gallery Mode (WGM)

Whispering gallery mode is the energy distribution pattern in which the evanescent waves are internally reflected or focused by the surface of the EM structure. Due to minimal reflection and radiation losses, the WGM pattern reaches unusually high quality factors, and thus, WGM is useful for wireless energy transfer.

Figure 3:
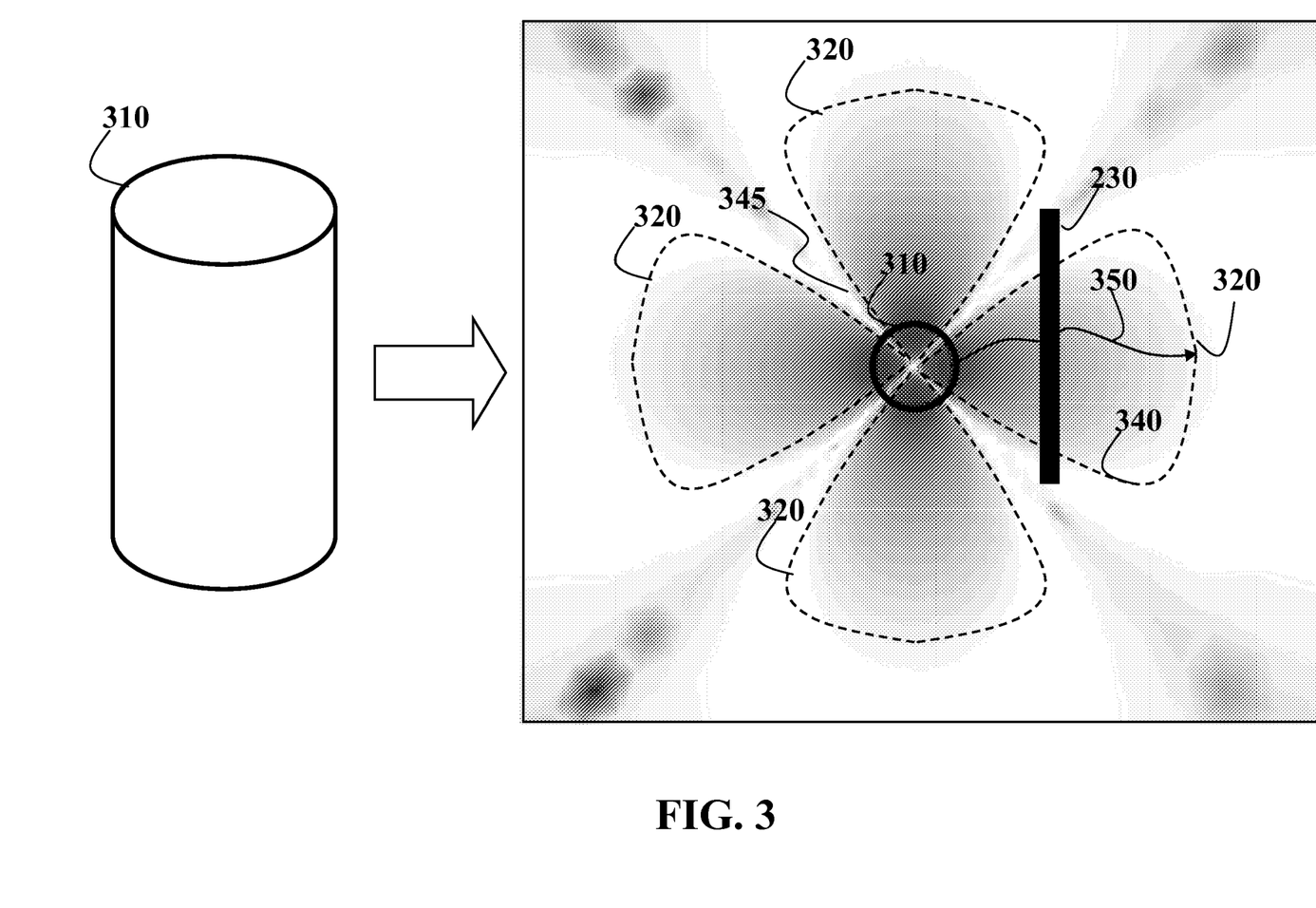
FIGS. 3-5 are diagrams of different energy distribution pattern.

FIG. 3 shows an example of the EM structure, i.e., a cylinder 310. Depending on material, geometry and dimensions of the cylinder 310, as well as the dominant frequency, the EM near-field intensities and energy density are maximized at the surface of the disk according to a WGM pattern 320.

The WGM pattern is not necessarily symmetric to the shape of the EM structure. The WGM pattern typically has blind zones 345, in which the intensity of the EM near-field is minimized, and optimal zones 340, in which the intensity of the EM near-field is maximized. Some embodiments of the invention place the NIM 230 in the optimal zones 340 to extend a range of the evanescent waves 350.

Even and Odd Modes

Figure 4:
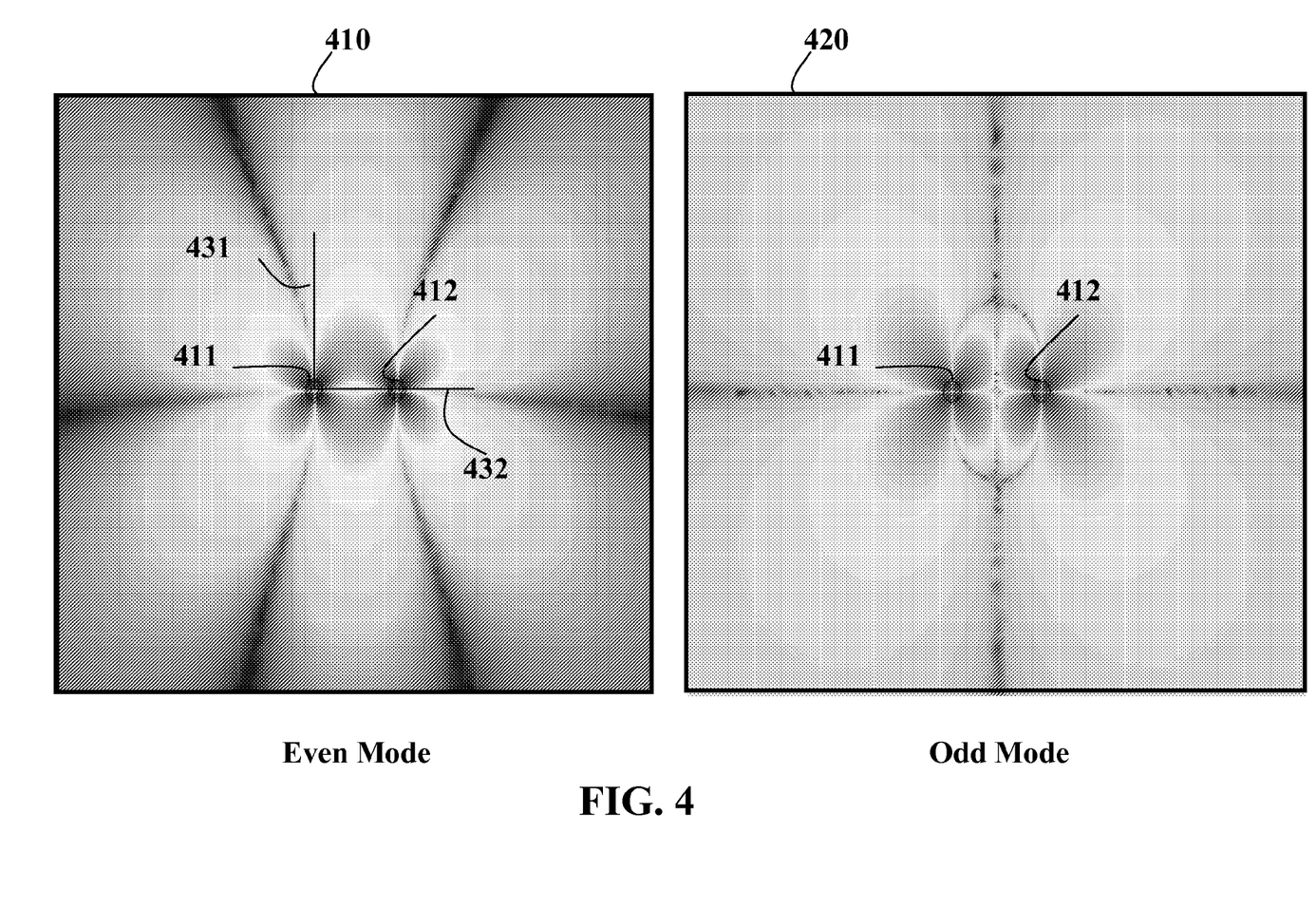

FIG. 4 shows a butterfly energy distribution pattern. When two EM structures 411 and 412 are coupled to each other forming a coupled system, the dominant frequency of the coupled system is represented by even and odd frequencies. The near-field distribution at even and odd frequencies is defined as even mode coupled system 410 and an odd mode coupled system 420. Typical characteristic of the even and the odd modes of the coupled system of two EM structures is that if the EM field is in phase in the even mode then the EM field is out of phase in the odd mode.

Butterfly Pair

The even and odd mode coupled systems generate an odd and even mode distribution patterns of the near-field intensities defined as a butterfly pair. The EM near-field intensity distribution of the butterfly pair reaches minimum in two lines 431 and 432 oriented at 0 degree and 90 degree to the center of each EM structure, i.e., blind zones of the butterfly pair. However, it is often desired to change the intensity distribution and eliminate and/or change the positions and/or orientations of the blind zones.

Crossing Pair

Figure 5:
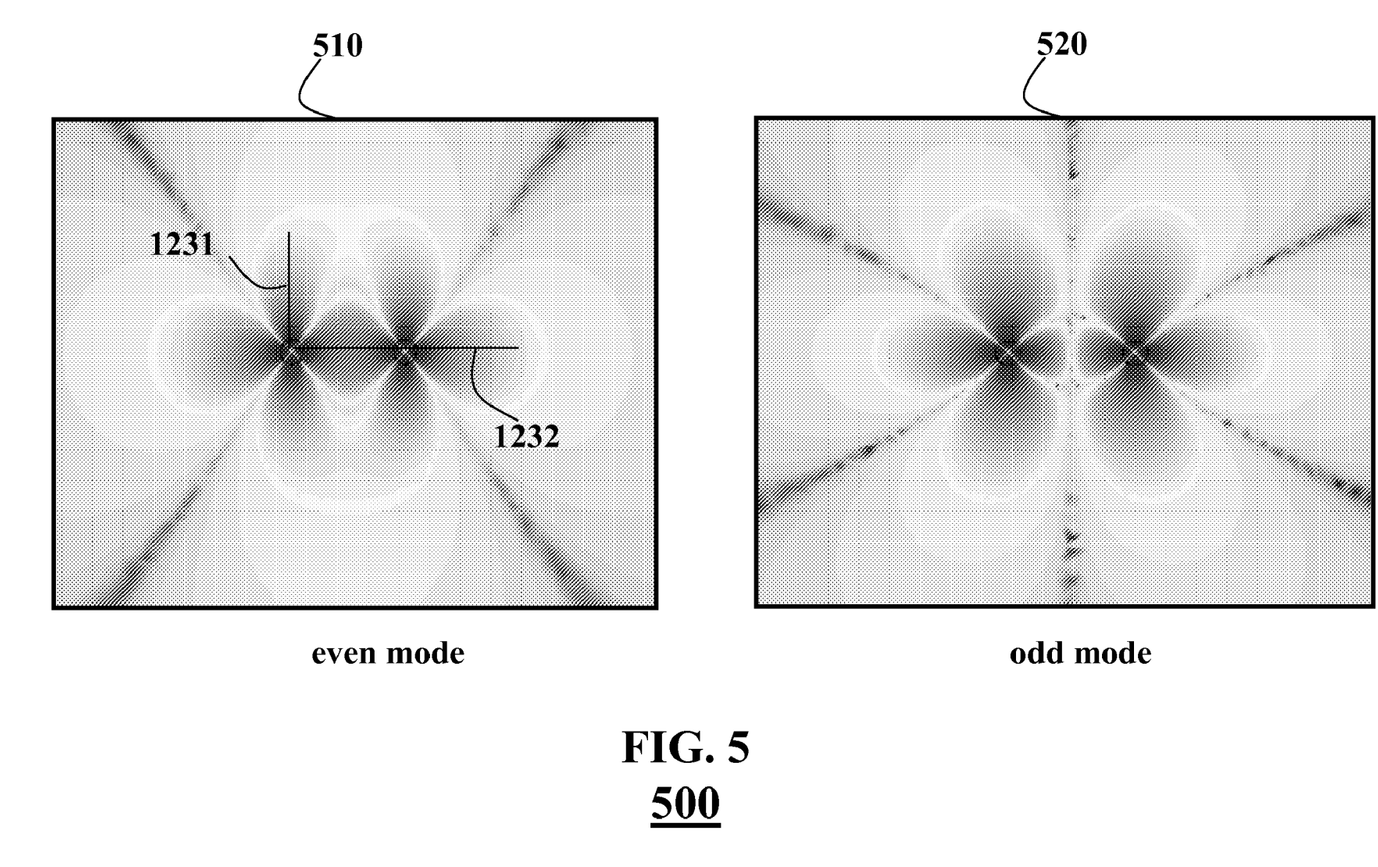

FIG. 5 shows distribution patterns of the near-field intensities according embodiments of the invention define as a crossing pair 500. The crossing pair distribution pattern has optimal zones 531 and 532 oriented at 0 degree and 90 degree to the center of each EM structure, i.e., the optimal zones of the crossing pair pattern corresponds to the blind zones of the butterfly pair pattern. Therefore, one important characteristic of the butterfly pair and the crossing pair patterns is that their respective blind zones are not overlapping, and thus allows for eliminating the blind zones when both kinds of patterns are utilized. Butterfly and crossing patterns have the system quality factor and the coupling coefficient of the same order of magnitude.

Waveguide

Embodiments of the invention use different types of the waveguides configured to generate the evanescent wave on the surface of the waveguides. For example, in one embodiment, the waveguide is a dielectric waveguide, e.g., a cylinder 310, which generated the evanescent wave, upon receiving the energy, on the part of the surface that do not have a conductive cover.

Another embodiment uses a Goubau line described in U.S. Pat. Nos. 2,685,068 and 2,921,277, incorporated herein by reference, which propagates the energy non-radiatively along a single unshielded wire. The evanescent waves are confined near the surface of the wire.

Figure 6:
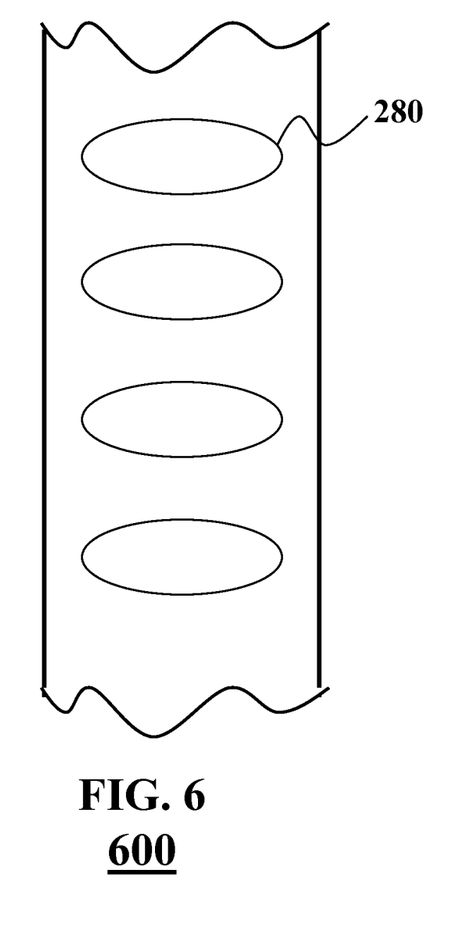
FIGS. 6-7 are schematics of example of waveguides and energy sink.

FIG. 6 shows a waveguide 600 according another embodiment of the invention. By creating slots, holes, perforations or other structures 280 analogous to the Goubau line on the surface of the waveguide 600, the evanescent, non-radiating waves are generated.

Sink

Figure 7:
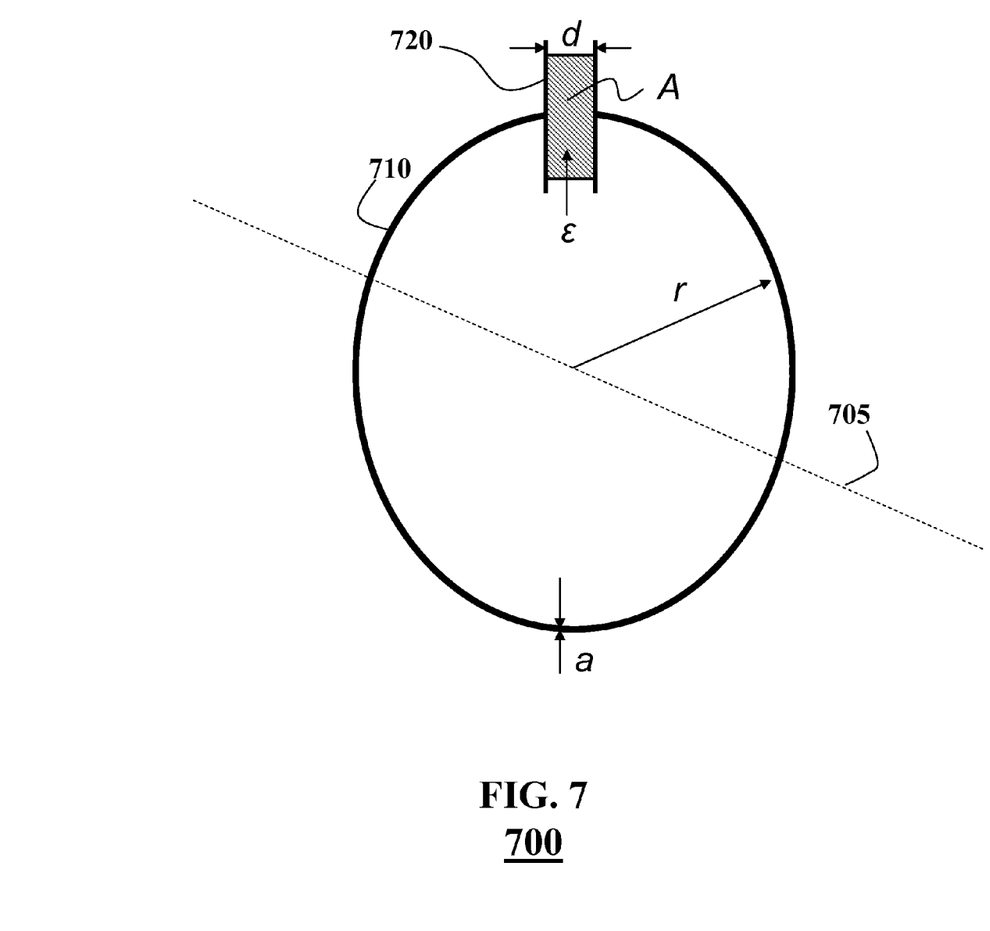

In one embodiment, the EM structures of the sink are implemented as a loop 700 as shown in FIG. 7. The loop of a radius r is formed by a conductor wire 710 of a radius a, and by a capacitor 720 having a relative permittivity $\in$. A plate area of the capacitor is A, and the plates are separated over a distance d. The loop 700 has axis 705. In one variation of the embodiment, the loop is a resonant structure. However, other embodiment uses different implementation of the structures, e.g., a disc. In another embodiment, the loop is rotated such that an axis of the loop is perpendicular to the waveguide.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system configured to transfer energy wirelessly, comprising:
   a source configured to generate evanescent waves, in response to receiving the energy, on at least part of a surface of the source;
   a sink configured to receive the energy wirelessly from the source via a coupling of the at least part of the evanescent waves; and
   a load configured to receive the energy from the sink, wherein the load and the sink are configured to move along the surface of the source such that the at least a part of the evanescent waves are coupled between the source and the sink within an energy transfer area.

2. The system of claim 1, wherein the source is a waveguide.

3. The system of claim 1, further comprising:
   a driver configured to supply the energy to the source.

4. The system of claim 1, further comprising:
   a negative index material (NIM) arranged within the energy transfer area such that the coupling is enhanced.

5. The system of claim 1, wherein the source and the sink are resonant structures.

6. The system of claim 2, wherein the NIM is arranged based on the predetermined location of the sink.

7. The system of claim 1, wherein the load is an elevator car.

8. The system of claim 1, wherein the load is a train.

9. The system of claim 1, wherein the sink is arranged based on an energy distribution pattern selected from a group of patterns consistent of an even butterfly pattern, an odd butterfly pattern, even crossing pattern, and an odd crossing pattern.

10. The system of claim 1, wherein the NIM has a negative permittivity property and a negative permeability property.

11. The system of claim 3, further comprising:
    a power meter configured to supply at least part of the energy to the driver.

12. The system of claim 2, wherein the waveguide includes slots configured to generate the evanescent waves.

13. The system of claim 2, wherein the waveguide is an optical waveguide.

14. The system of claim 2, wherein the sink includes a loop, wherein the loop is rotated such that an axis of the loop is perpendicular to the waveguide.

15. A method for transferring energy wirelessly via a coupling of near-fields, comprising steps of:
providing a source configured to transfer an energy wirelessly to a sink via the coupling of near-fields of the source and the sink, wherein the source and the sink are non-radiative structures configured to generate EM near-fields in response to receiving the energy; and
moving the sink along a surface of the source such that the near-field of the source and the near-field of the sink are coupled within an energy transfer area.

16. The method of claim 15, further comprising:
implementing the source as a waveguide such that the near-field is generated on at least part of the surface of the waveguide.

17. The method of claim 15, further comprising:
supplying the energy from a driver to the source; and
supplying the energy from the sink to a load.

18. The method of claim 17, wherein the load is an elevator or a train.

19. The method of claim 15, further comprising:
supplying the energy, unused during the transferring of the energy from the source to the sink, to the driver.

20. The method of claim 15, further comprising:
determining an amount the energy unused during the transferring of the energy from the source to the sink;
transmitting a feedback control signal indicating the amount to a driver; and
controlling the energy of the driver such that to minimize the energy unused during the transferring.

21. The method of claim 17, further comprising:
increasing the coupling using negative index material (NIM).

* * * * *